United States Patent [19]
Koike et al.

[11] Patent Number: 5,166,522
[45] Date of Patent: Nov. 24, 1992

[54] SPIN DETECTOR

[75] Inventors: Kazuyuki Koike, Tokyo; Takashi Furukawa; Hideo Matsuyama, both of Saitama, all of Japan

[73] Assignee: Hitachi, Ltd., Tokyo, Japan

[21] Appl. No.: 799,934

[22] Filed: Nov. 29, 1991

[30] Foreign Application Priority Data

Nov. 30, 1990 [JP] Japan .................................. 2-337079

[51] Int. Cl.[5] .......................................... H01J 47/00
[52] U.S. Cl. .................................... 250/310; 250/306; 250/397
[58] Field of Search ............... 250/310, 306, 397, 398, 250/307

[56] References Cited

U.S. PATENT DOCUMENTS

| | | | |
|---|---|---|---|
| 4,153,844 | 5/1979 | Kirschner | 250/492.1 |
| 4,658,138 | 4/1987 | Koike et al. | 250/310 |
| 4,760,254 | 7/1988 | Pierce et al. | 250/306 |
| 4,954,770 | 9/1990 | Matsuyama et al. | 250/306 |

FOREIGN PATENT DOCUMENTS 60-17846 1/1985 Japan .

OTHER PUBLICATIONS

Dodt et al., "Spin and Energy dependence of the electron current absorbed by α-Fe (001) Thin Film" Europhysics Letter, 6(4), pp. 375–379 (1988).

Primary Examiner—Jack I. Berman
Assistant Examiner—Kiet T. Nguyen
Attorney, Agent, or Firm—Antonelli, Terry, Stout & Kraus

[57] ABSTRACT

A measured electron beam having a polarization vector as represented by arrow is irradiated to a ferromagnetic target made of an iron single crystal through a polarization vector rotator comprising a magnetic field generation coil and an electrostatic lens. A magnetic field generator is coupled with the target and aligns the direction of magnetization of the target in a direction represented by arrow. An oscillator for providing a rotation signal of the polarization vector of the measured electron beam is connected to the polarization vector rotator. The current absorbed by the target is detected and amplified by a current amplifier. A lock-in amplifier detects the phase and the magnitude of an A.C. component using the signal from the oscillator as a reference signal. The magnitude of the D.C. component of the absorbed current is detected by a D.C. current detector.

7 Claims, 12 Drawing Sheets

SPIN DETECTOR

BACKGROUND OF THE INVENTION

This invention relates to measurement of a polarization vector of an electron beam and to a spin detector capable of detecting simultaneously the magnitude and direction of the polarization vector inside a two-dimensional plane or inside a three-dimensional space.

A spin detector for detecting the direction and magnitude of a polarization vector by using absorption or scattering of a measured electron beam by a target is described, for example, in "Electron Spin Polarization Ratio Detector" (by Koike et al., JP-A-60-178460). According to this method, the trajectory of the measured electron beam incident along the center axis of the detector is once bent and spaced apart from the center axis, and is bent once again and is allowed to be incident into the target plane with a certain angle to the center axis, and is rotated around the center axis in such a manner that this angle of incidence and position of incidence do not change.

SUMMARY OF THE INVENTION

However, it is by no means easy to rotate the electron trajectory without strictly changing the angle of incidence and the position of incidence, and since a gold evaporation film is used as the target, detection sensitivity is low. A component of the polarization vector can be detected with an incomparably higher sensitivity by use of a ferromagnetic substance as the target than by the use of the gold evaporation film as described in Th. Dodt et al "Europhysics Letter" (64), 1988, 375. However, this method cannot detect simultaneously both the magnitude and direction of the polarization vector by one measurement.

It is a primary object of the present invention to provide a spin detector which can detect simultaneously the magnitude and direction of the polarization vector with a high level of sensitivity without using any high level technique for adjusting the angle and position of the electron beam.

The present invention accomplishes high sensitivity detection by the use of a ferromagnetic substance as the target, allows the measured electron beam to be incident substantially vertically to the target surface so as to sufficiently minimize the dependence of the absorbed current on the angle of incidence, and rotates the polarization vector of the electron beam or the trajectory of the electron beam or the magnetization vector of the target around the center axis of the detector so as to accomplish a spin detector capable of detecting simultaneously the magnitude and direction of the polarization vector without requiring strict control.

DESCRIPTION OF THE PREFERRED EMBODIMENTS

The D.C. current value of a current due to an electron beam absorbed by a ferromagnetic target or of a current due to an electron beam scattered by the target varies while it depends on the inner product of a polarization vector of an electron beam to be measured and a magnetization vector of the target. Accordingly, if the polarization vector of the trajectory or the magnetization vector is rotated and the change component of the current value of the electron beam absorbed by the target or of the current value of the electron beam scattered by the target or the change component of the current value which is obtained by synthesizing both of these electron beams in such a fashion that the phase of one of the current is opposite, is detected by a lock-in system by the use of the signals associated with the polarization vector or with the electron trajectory or with the rotation of the magnetization vector as the reference signal, so as to determine the magnitude and phase of the change component, then, the direction of the polarization vector can be determined from that phase and the magnitude of the polarization vector can likewise be determined from the ratio of its magnitude to the total absorbed currents or total scattered currents or the ratio of the total absorbed currents to the sum of the total scattered currents.

Hereinafter, the structure of the spin detector of the present invention and the principle of its operation will be explained in detail with reference to the accompanying drawings.

Figure 1:
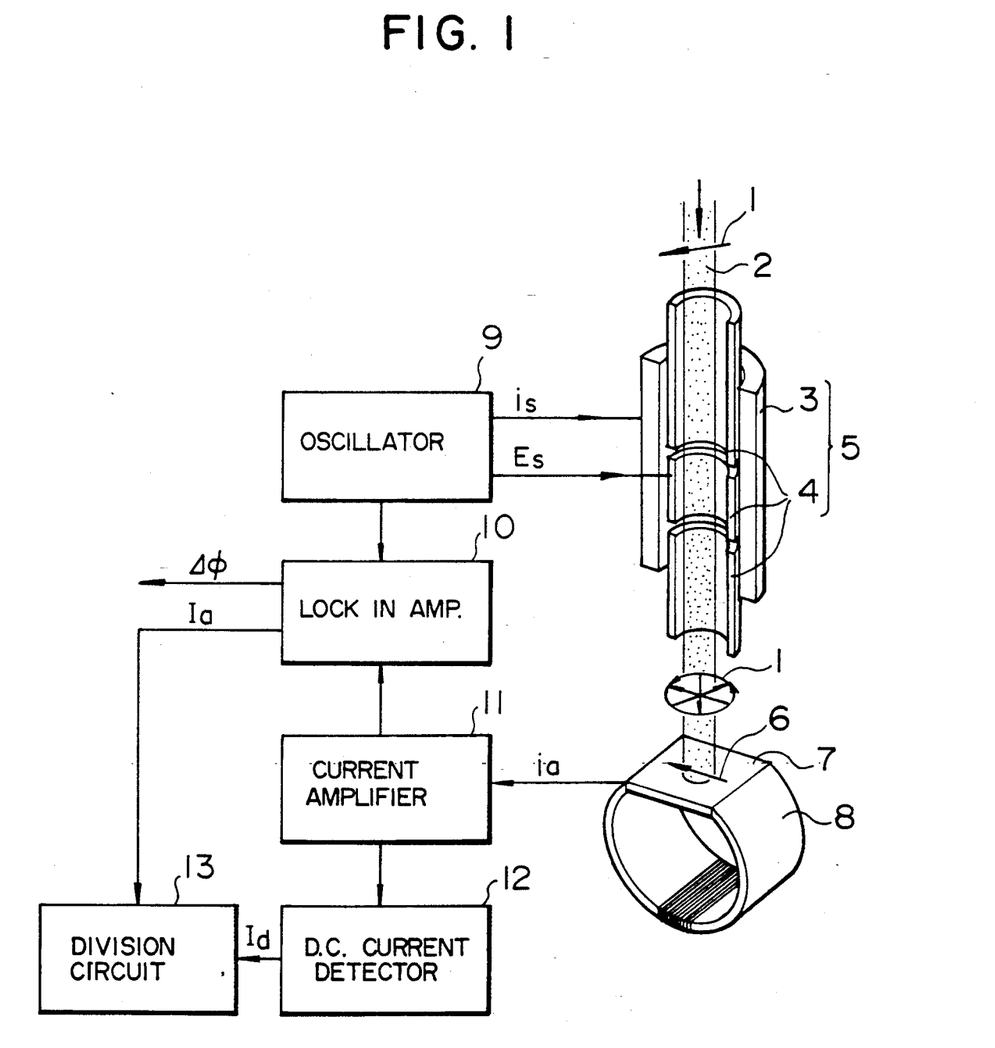
FIG. 1 shows the fundamental structure of the first embodiment of the spin detector of the present invention.

FIG. 1 shows the fundamental structure of the first embodiment of the spin detector of the present invention. In this embodiment, an electron beam 2 to be measured having a polarization vector represented by arrow 1 is irradiated to a ferromagnetic target 7 as an iron single crystal through a polarization vector rotator 5 comprising a magnetic field generation coil 3 and an electrostatic lens 4. The target 7 is coupled with a magnetic field generator 8 and the direction of this target 7 is aligned with the direction of arrow 6. An oscillator 9 for providing a rotation signal of the polarization vector of the electron beam 2 is connected to the polarization vector rotator 5. The current absorbed by the target 7 is detected and amplitude by a current amplifier 11. A lock-in amplifier 10 detects the phase signal and the magnitude of its A.C. components of absorbed current by the use of the signal from the oscillator 9 as a reference signal. The magnitude of the D.C. component of the absorbed current is detected by an ammeter 12.

The ratio of the A.C. component of the absorbed current to the D.C. component is calculated by a division circuit 13. Here, the rotation of the polarization vector (represented by arrow 1) of the electron beam 2 to be measured is effected by a saw tooth wave current $i_s$ of the oscillator 9 connected to the magnetic field generation coil 3 inside the polarization vector rotator 5, which current $i_s$ changes to positive and negative polarities with a predetermined cycle and a predetermined amplitude. The polarization vector turns once per cycle of this current $I_s$. This coil 3 has also the lens function. Therefore, focusing characteristics of the electron beam also change. For this reason, the focusing characteristics of the electron beam are kept constant by effecting a dynamic focusing adjustment for changing the intensity of the electrostatic lens in accordance with the field intensity (by changing the D.C. voltage Es to be applied to the electrostatic lens 4 in accordance with the current value $i_s$).

Figure 2:
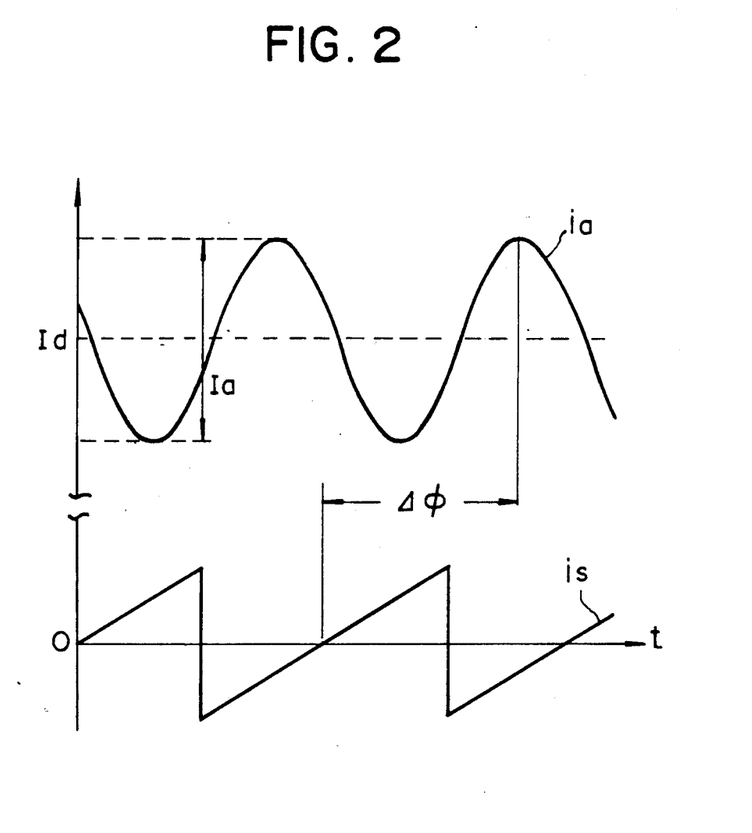
FIG. 2 is a waveform diagram useful for explaining a detection current in the embodiment shown in FIG. 1.

FIG. 2 shows the relation between the saw tooth wave current $i_s$ as the rotation signal from the oscillator 9 when the electron beam 2 to be measured is incident along the center axis of the polarization vector rotator 5 and the absorbed current $i_a$ of the target 7 which is detected and amplified by the current amplifier 11. When the saw tooth wave current $i_s$ is caused to flow through the magnetic field generation coil 3 from the oscillator 9 and the polarization vector of the electron beam 2 is rotated at a uniform angular velocity around the center axis, the absorbed current $i_a$ by the target 7 changes sinusoidally as shown in FIG. 2.

When the phase of this A.C. signal $i_a$ is detected by the lock-in amplifier 10 using the signal from the oscillator 9 (saw tooth wave current $i_s$) as the reference signal, the phase difference $\Delta\phi$ between the reference signal and the detected A.C. signal corresponds to the angle described between the polarization vector (arrow 1) of the electron beam 2 incident into the detector and the magnetization vector (arrow 6) of the target 7 and in this way, the direction of the polarization vector can be detected.

The magnitude of the polarization vector can be determined by dividing the amplitude Ia of the A.C. signal $i_a$ by the current Id detected by the D.C. current detector 12, by the use of the division circuit 13. Needless to say, the effective value or mean value of the A.C. signal $i_a$ can be used in place of the amplitude Ia of the A.C. signal $i_a$ and in this case, the magnitude of the polarization vector can be obtained by multiplying the resulting value by a suitable coefficient. This also holds true of later-appearing embodiments.

Figure 3:
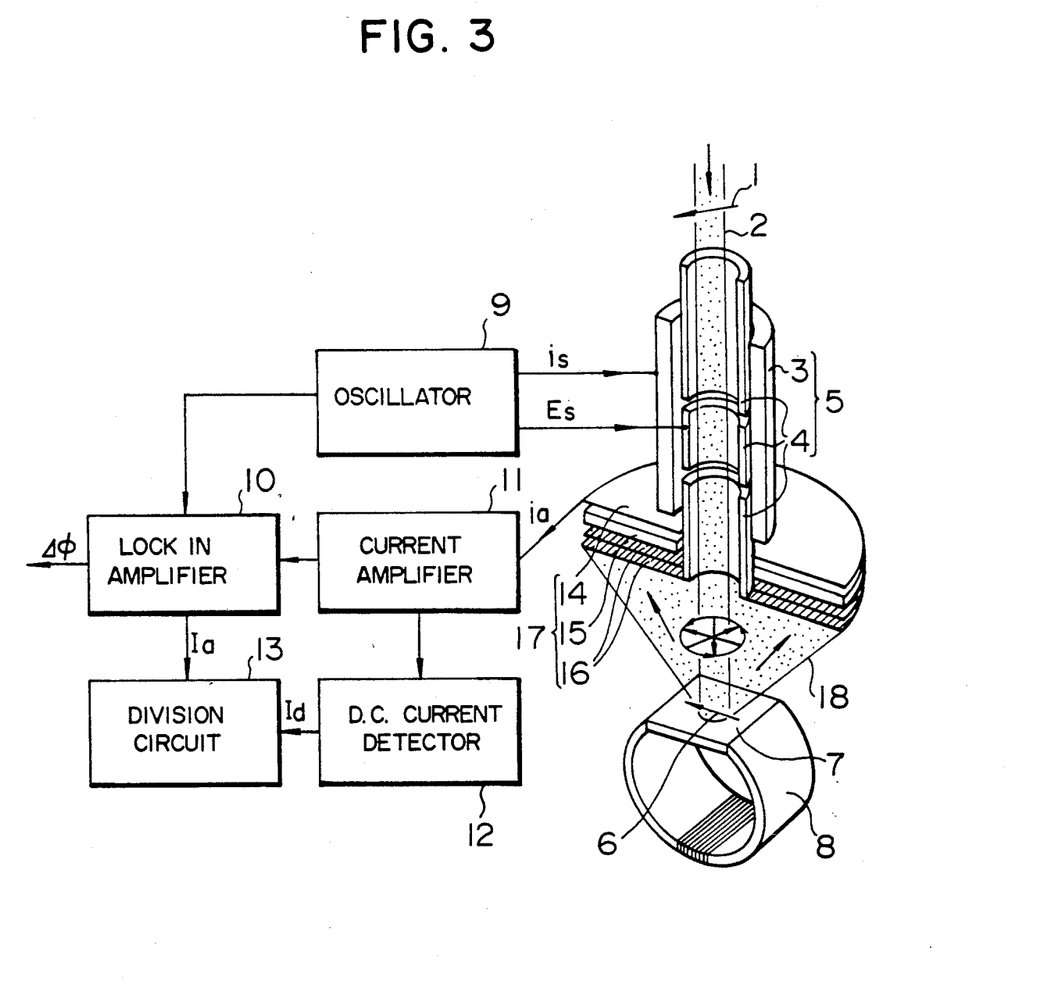
FIG. 3 shows the fundamental structure of the second embodiment of the spin detector of the invention.

FIG. 3 shows the fundamental structure of the second embodiment of the spin detector in accordance with the present invention. Whereas the embodiment shown in FIG. 1 detects the absorbed current of the target 7, this embodiment detects scattered electrons of the target 7 and the rest of constructions are the same as those of the embodiment shown in FIG. 1.

The scattered electron 18 is detected by a scattered electron beam detector 17. In the embodiment shown in the drawing, the scattered electron 18 is detected by an MCP assembly (comprising a grid 16, a micro-channel plate 15 and an anode 14) for multiplying and detecting the beam and its output current is detected and amplified by an amplifier 11.

Figure 4:
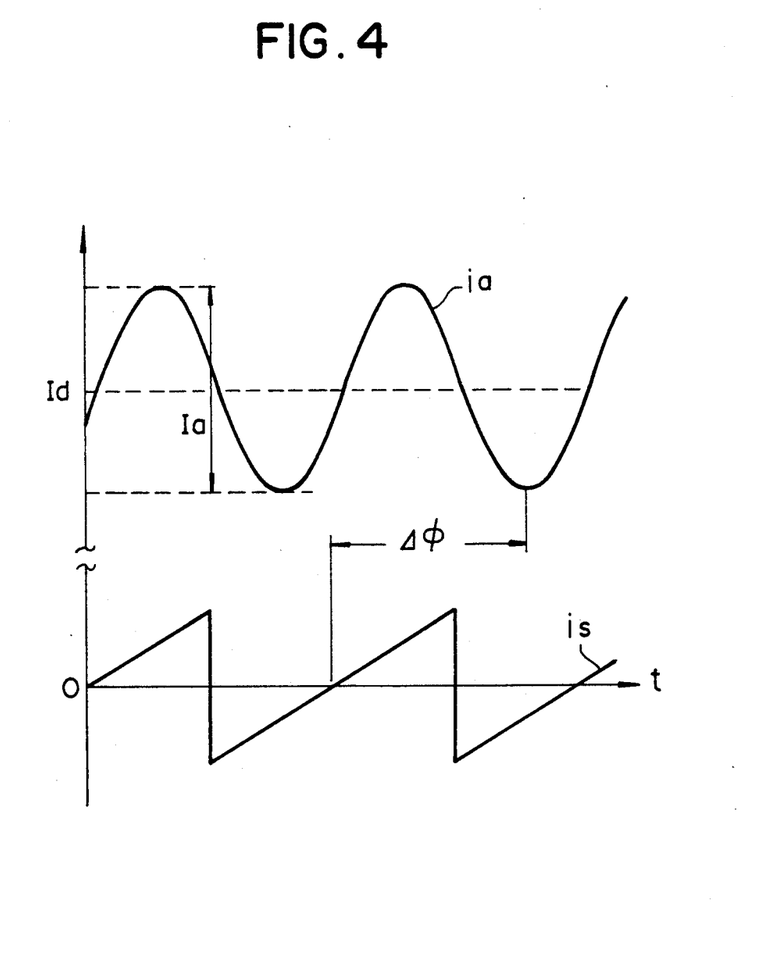
FIG. 4 is a waveform diagram useful for explaining the detection current in the embodiment shown in FIG. 3.

When the electron beam 2 to be measured is irradiated onto the target 7 while the polarization vector of this beam 2 is rotated in the same way as in the first embodiment and the scattered electron 18 is detected, an output current having an A.C. signal $i_a$, whose polarity is inverted to that of the first embodiment, can be obtained as shown in FIG. 4. The phase difference $\Delta\phi$ and amplitude Ia of this A.C. signal are detected by a lock-in amplifier 10 in the same way as in the first embodiment and the current Id of the D.C. component is detected by a current detector 12. In this way, the magnitude and direction of the polarization vector can be detected.

Though this spin detector becomes more expensive than the spin detector of the first embodiment, the polarization vector can be detected at a higher level of accuracy because a greater S/N can be obtained.

Figure 5:
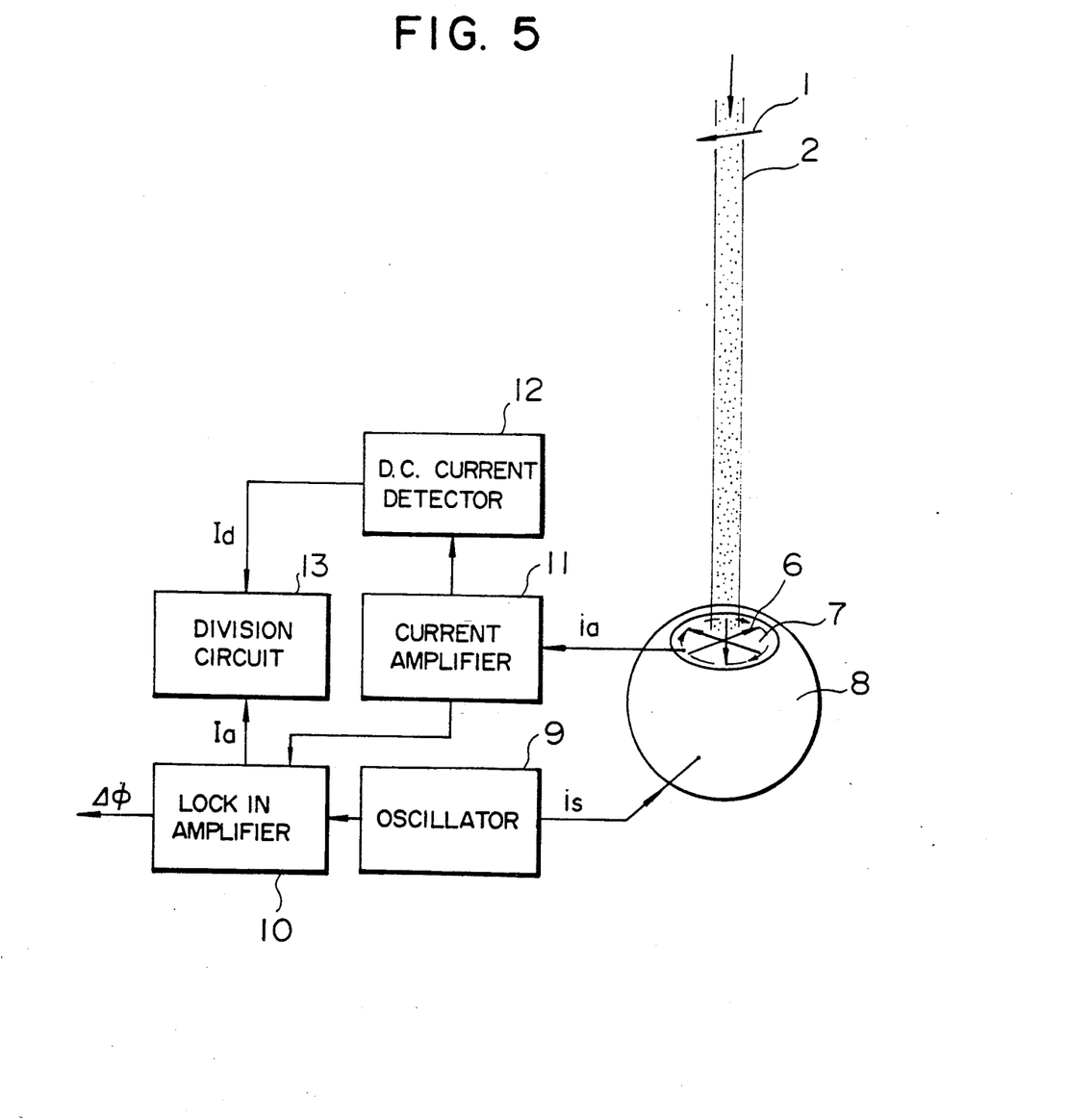
FIG. 5 shows the fundamental structure of the third embodiment of the spin detector of the invention.

FIG. 5 shows the fundamental structure of the third embodiment of the spin detector of the present invention. Whereas the target 7 in the embodiment shown in FIG. 1 is the iron single crystal, it is an amorphous iron alloy and the magnetization vector of the target 7 is rotated in place of the polarization vector of the electron beam to be measured in this embodiment. The rest of the constructions are the same as those of the embodiment shown in FIG. 1.

A magnetic field generator 8 generates a rotating magnetic field in order to rotate the magnetization vector of the target 7. The signal $i_s$ applied to the magnetic field generator 8 is substantially the same as the signal $i_s$ applied to the polarization vector rotator 5, and is used for rotating the magnetization vector of the target 7 and also as the reference signal of the lock-in amplifier 10.

The electron beam 2 to be measured is irradiated to the center axis of the target 7 and the magnetization vector (arrow 6) of the target 7 is rotated at a uniform angular velocity around this center axis by the signal from the oscillator 9. Then, the absorbed current $i_a$ by the target 7 changes sinusoidally in the same way as in FIG. 2. Though the current waveform of this absorbed current $i_a$ and its explanation are omitted, the phase signal and amplitude of this absorbed current $i_a$ are detected by the lock-in amplifier 10 in the same way as in the first embodiment. The magnitude and direction of the polarization vector can be detected by detecting the D.C. component by the current detector 12.

Needless to say, a mechanical structure may be employed for rotating the magnetization vector by a ultrasonic motor, or the like, for example, in this embodiment.

Since this embodiment does not require the dynamic focusing adjustment of the electron beam 2, the spin detector of this embodiment is easier to handle than those of the first and second embodiments.

Figure 6:
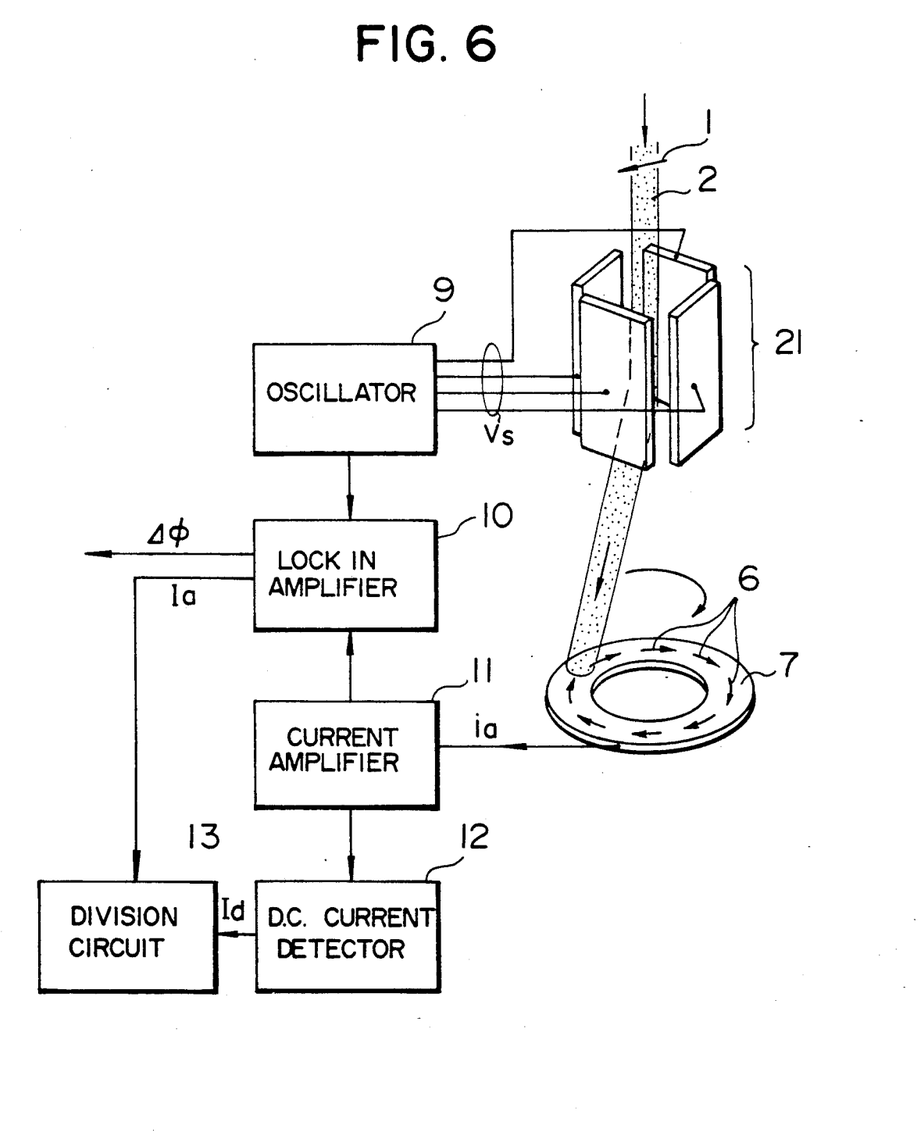
FIG. 6 shows the fundamental structure of the fourth embodiment of the spin detector of the invention.

FIG. 6 shows the fundamental structure of the fourth embodiment of the spin detector of the present invention. This embodiment does not rotate both of the polarization vector of the measured electron beam 2 and the magnetization vector of the target 7. Instead, the electron beam 2 is rotated so that the trajectory of the electron beam 2 travels on the target 7 of the ring-like amorphous iron alloy which is shaped in a ring-like form and in which the magnetization vectors (arrow 6) are aligned in its circumferential direction. As a result, the polarization vector of the electron beam 2 to be measured is allowed to rotate relative to the magnetization vector of the target 7.

This embodiment includes an electron trajectory rotator 21 for rotating the electron beam to be measured around its center axis. The signal Vs of the oscillator 9 applied to the electron trajectory rotator 21 is substantially the same as the signal $i_s$ applied to the polarization vector rotator 5, rotates the electron beam 2 to be measured around the center axis and is also used as the reference signal of the lock-in amplifier 10.

When the electron beam 2 to be measured is allowed to travel on the target 7 by the signal from the oscillator 9, the absorbed current $i_a$ by the target 7 changes sinusoidally in the same way as in FIG. 2. Though the current waveform of the absorbed current and its explanation are omitted, the phase signal and amplitude of this absorbed current are detected by the lock-in amplifier 10 in the same way as in the first embodiment and the D.C. component is detected by the current detector 12. In this way, the magnitude and direction of the polarization vector can be detected.

This embodiment requires a target having high symmetry with respect to the axis. Since the rotating magnetic field need not be applied to the target, however, this embodiment can eliminate unnecessary bent of the trajectory of the incident electrons and scattered electrons due to the leakage magnetic field from the magnetic field generator 20.

Figure 7:
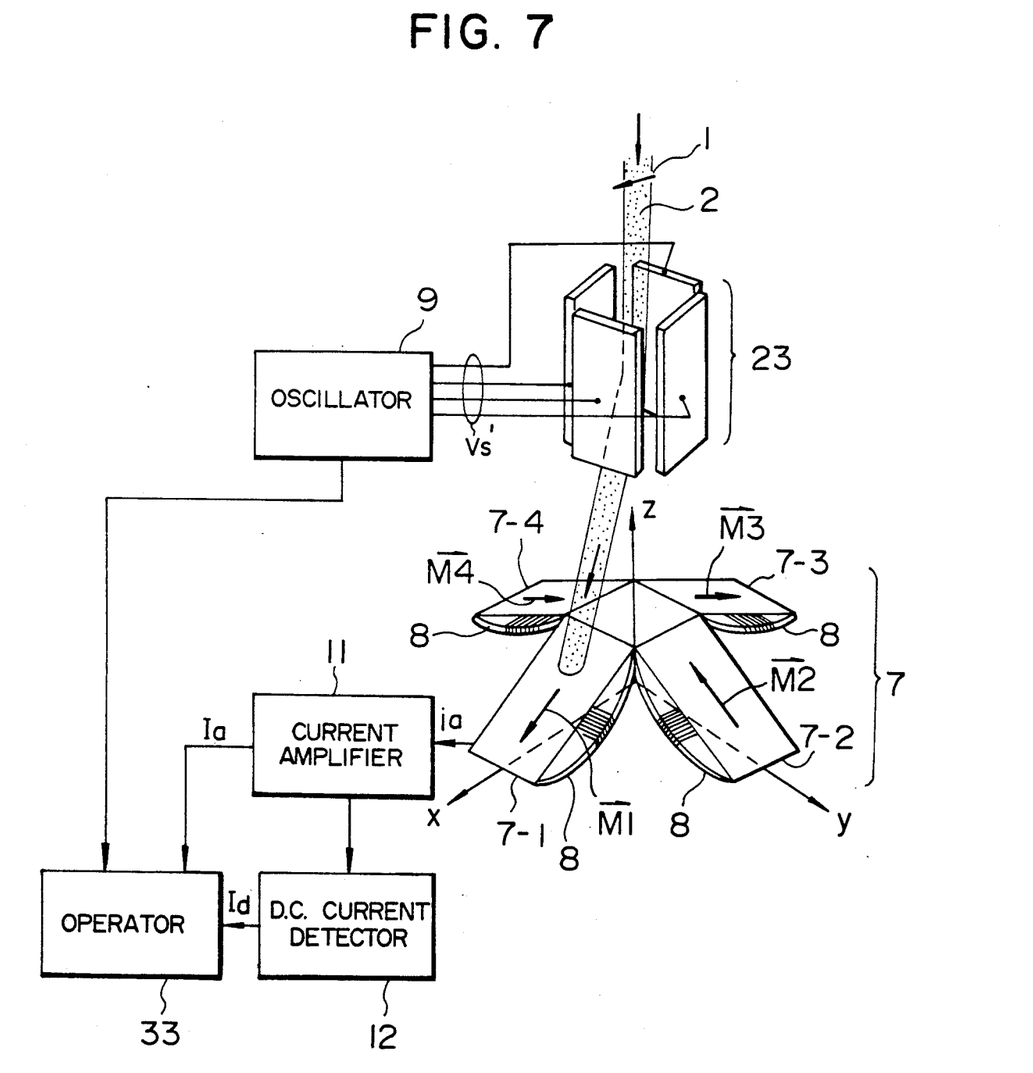
FIG. 7 shows the fundamental structure of the fifth embodiment of the spin detector of the invention.

FIG. 7 shows the fundamental structure of the fifth embodiment of the spin detector of the present invention. In this embodiment, the electron beam 2 to be measured is alternately irradiated to the target having an inclination to its center axis and the magnetization vector of the target is set in a predetermined direction.

To this and, an electron trajectory deflector 23 is disposed in place of the electron trajectory rotator 21 and this target 7 is constituted by a target group comprising four iron single crystal targets 7-1, 7-2, 7-3 and 7-4. Each target is connected electrically and is provided with an independent magnetic field generator 8 for providing a predetermined magnetization vector.

Let's consider an orthogonal coordinates system comprising x, y and z axes, and set the center axis of the detector to the z axis. It will be assumed in this case that the four iron single crystal targets 7-1, 7-2, 7-3 and 7-4 of the target 7 have their magnetizations $\vec{M}_1$, $\vec{M}_2$, $\vec{M}_3$ and $\vec{M}_4$ expressed by the following formulas of disposition, respectively:

$$\vec{M}_1 = M(\cos 45°, 0, -\sin 45°)$$

$$\vec{M}_2 = M(0, -\cos 45°, \sin 45°)$$

$$\vec{M}_3 = M(-\cos 45°, 0, -\sin 45°)$$

$$\vec{M}_4 = M(0, \cos 45°, \sin 45°),;$$

where, M represents the magnitude of magnetization.

Figure 8:
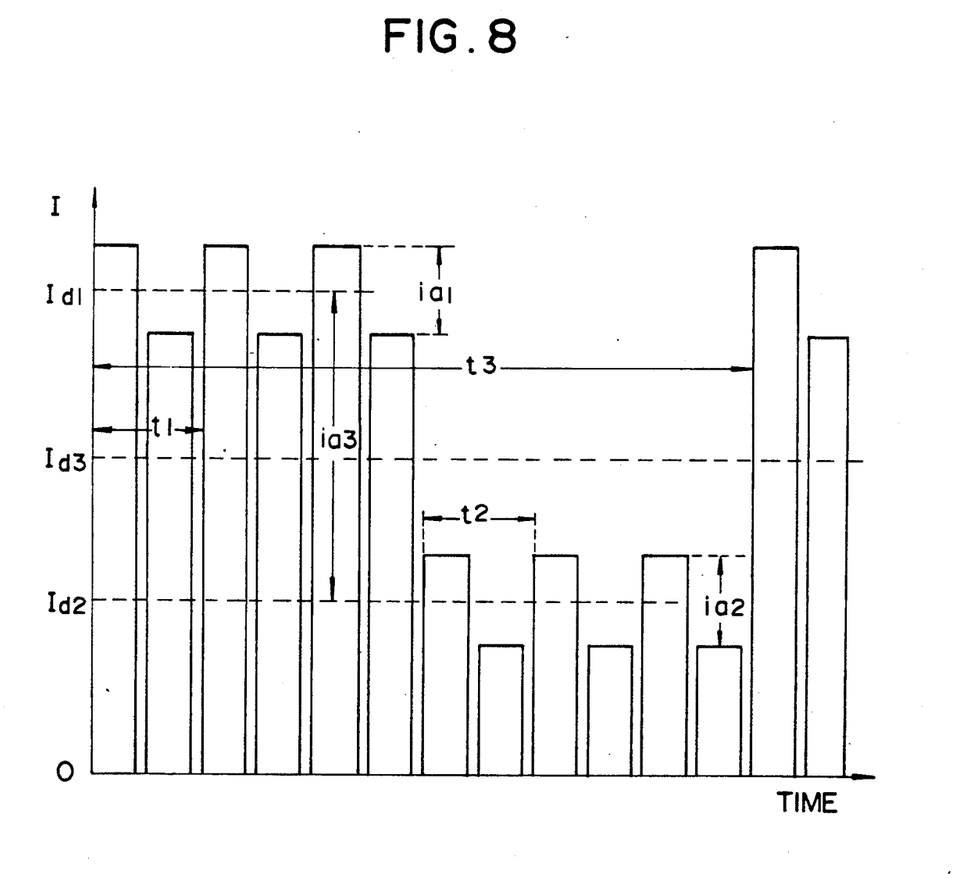
FIG. 8 is a waveform diagram useful for explaining the detection current in the embodiment shown in FIG. 7.

First of all, the electron beam 2 to be measured is allowed to be incident and the electron trajectory is scanned so that the electron beam irradiation position reciprocates in a uniform cycle $t_1$ between the targets 7-1 and 7-3. Next, the electron trajectory is scanned so that the electron beam irradiation position reciprocates in a uniform cycle $t_2$ between the targets 7-2 and 7-4. Furthermore, these scanning operations are carried out alternately in a uniform cycle $t_3$. This scanning operation of the electron trajectory is carried out by applying a signal vs' from the oscillator 9 to a scanner 23. When such a scanning is carried out, the absorbed current $i_a$ by the target 7 changes periodically as shown in FIG. 8.

The reason why the current reaches once zero is that the absorption of the electron beam does not exist when the electron beam shifts between the targets. The x component of the polarization vector can be detected by detecting the amplitude $ia_1$ of the absorbed currents $i_a$ obtained by the targets 7-1 and 7-3 among these targets and detecting the D.C. component $Id_1$ by the current detector 12. Similarly, the y component of the polarization vector can be detected by detecting the amplitude $ia_2$ of the A.C. signal of the absorbed current obtained from the targets 7-2 and 7-4 and detecting the D.C. component $Id_2$ by the D.C. current detector 12. Furthermore, as the mean value of the absorbed currents obtained by the targets 7-1 and 7-3 and the mean value of the absorbed currents obtained by the targets 7-2 and 7-4 change periodically, the z component of the polarization vector can be detected by calculating the amplitude $ia_3$ of the A.C. signal, the mean D.C. current $Id_3$ of the D.C. component $Id_1$ and of the D.C. component $Id_2$ from the amplitude $ia_1$, the amplitude $ia_2$, the D.C. component $Id_1$ and the D.C. component $Id_2$. Accordingly, if the detection of these three x, y and z components of the polarization vector and the calculation for arithmetically combining them are carried out by an operator 33, the direction and magnitude of the polarization vector in the coordinate axes x, y and z can be detected by arithmetic processing. In this embodiment, the timing signal from the oscillator 9 is used for stipulating the target, onto which the electron beam to be measured is irradiated, but not for the detection of the phase difference.

In this embodiment, the trajectory of the electron beam 2 to be measured may be set to a round shape as shown in FIG. 6. In this case, the output of the current detector becomes different from the one shown in FIG. 8. But processing can be made in the same way as explained with reference to FIG. 8 because the signal from which target can be judged by referring to the signal from the oscillator 9.

Whereas the first, second, third and fourth embodiments can simultaneously detect only two components of the polarization vector, this embodiment can simultaneously detect three components of the polarization vector.

In the third, fourth and fifth embodiments, the polarization vector can be detected at a high level of accuracy by the method of detecting the scattered electrons from the target in the same way as in the second embodiment, though the method is not shown in the drawing as another embodiment.

Figure 9:
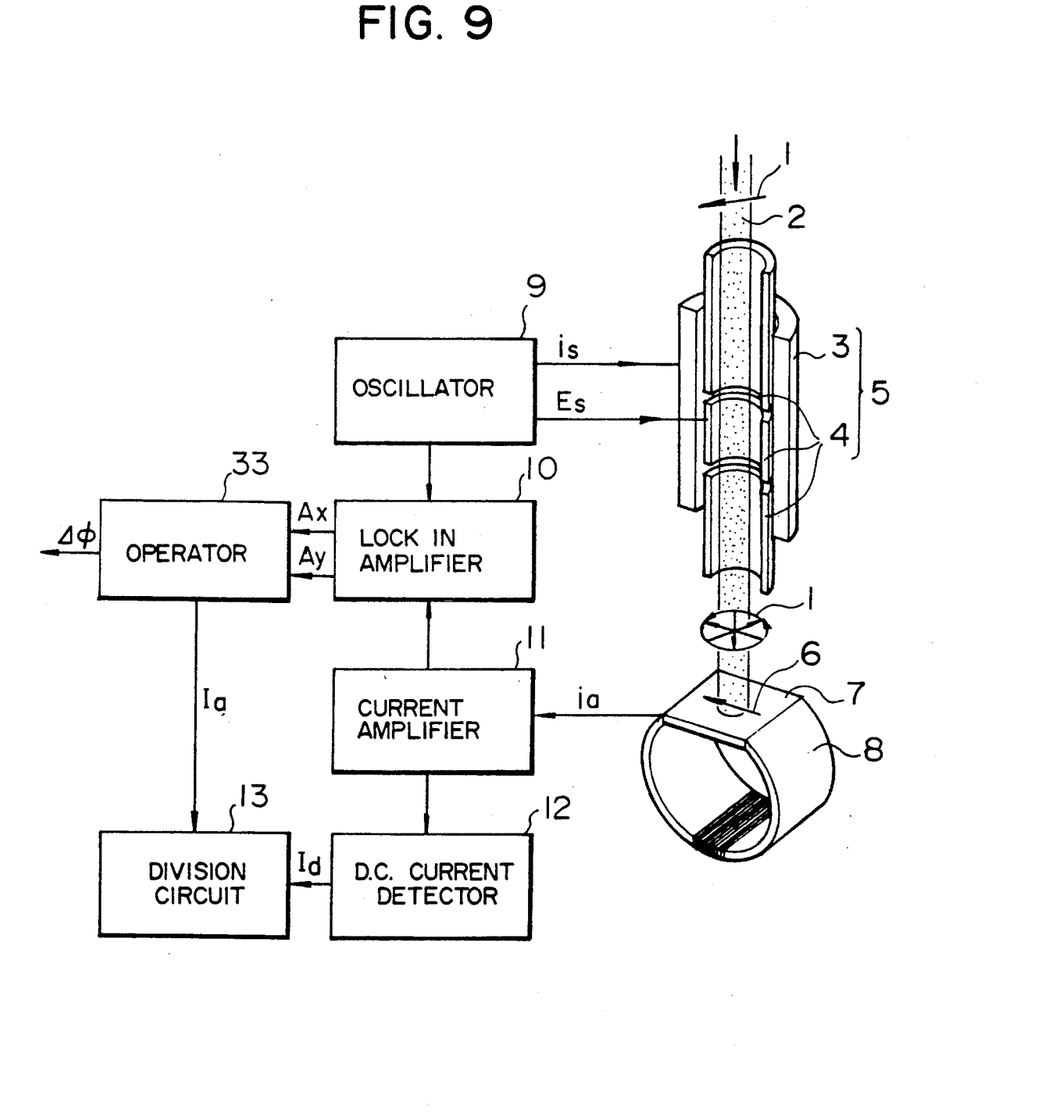
FIG. 9 shows the fundamental structure of the sixth embodiment of the invention.
Figure 10:
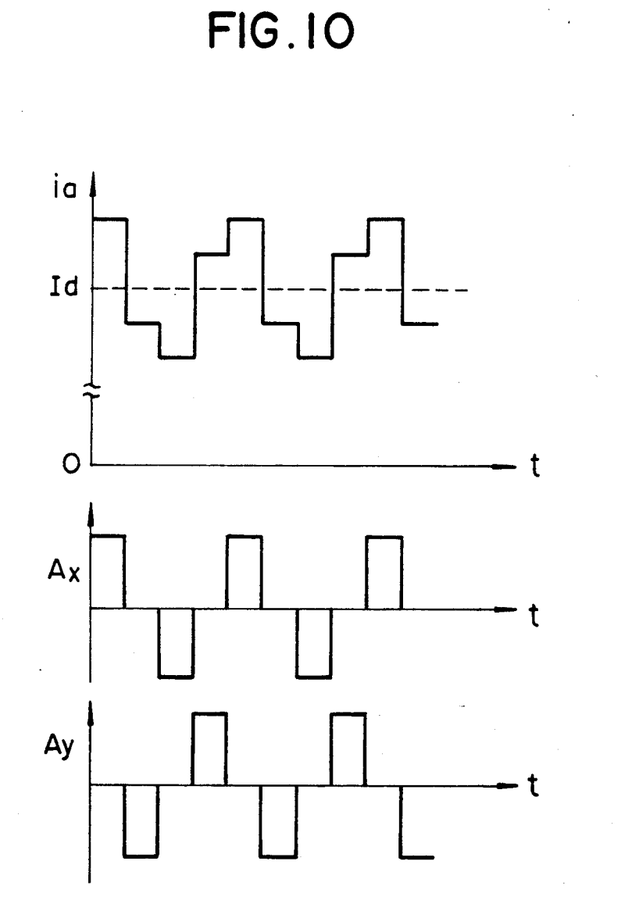
FIG. 10 is a waveform diagram useful for explaining the detection current in the embodiment shown in FIG. 9.

FIG. 9 shows still another embodiment of the present invention. This embodiment is structurally the same as the spin detector shown in FIG. 1. However, whereas the spin detector shown in FIG. 1 rotates the polarization vector of the electron beam at a uniform angular velocity, this embodiment rotates step-wise the polarization vector by 90°. The current $i_a$ absorbed by the target 7 at this time changes step-wise as shown in FIG. 10. When this current signal is detected by the lock-in amplifier 10 by the use of two reference wave signals sx and sy (see FIG. 10) the phases of which are different by 90° and which are obtained from the rotation signal $i_s$, signals Ax and Ay which are proportional to the two components Px and Py of the polarization vector can be obtained. When the formula $$\Delta\phi = \tan^{-1}(Ax/Ay)$$

is calculated by the operator 33 using the signals Ax and Ay, Δφ proves to be the angle described between the polarization vector of the incident electron beam and the magnetization vector of the target. When $\sqrt{Ax^2+Ay^2}$ is divided by the current detector 12 by the divider 13, the magnitude of the polarization vector can be determined.

When the magnetization vector of the target is stepwise rotated by 90° in the same way as in the third embodiment (shown in FIG. 5) in which the polarization vector is step-wise rotated by 90°, the direction and magnitude of the polarization vector can be likewise detected. This embodiment is particularly effective in the case where the axis of easy magnetization is symmetric four times as in the case of the (001) plane of the iron single crystal.

Figure 11:
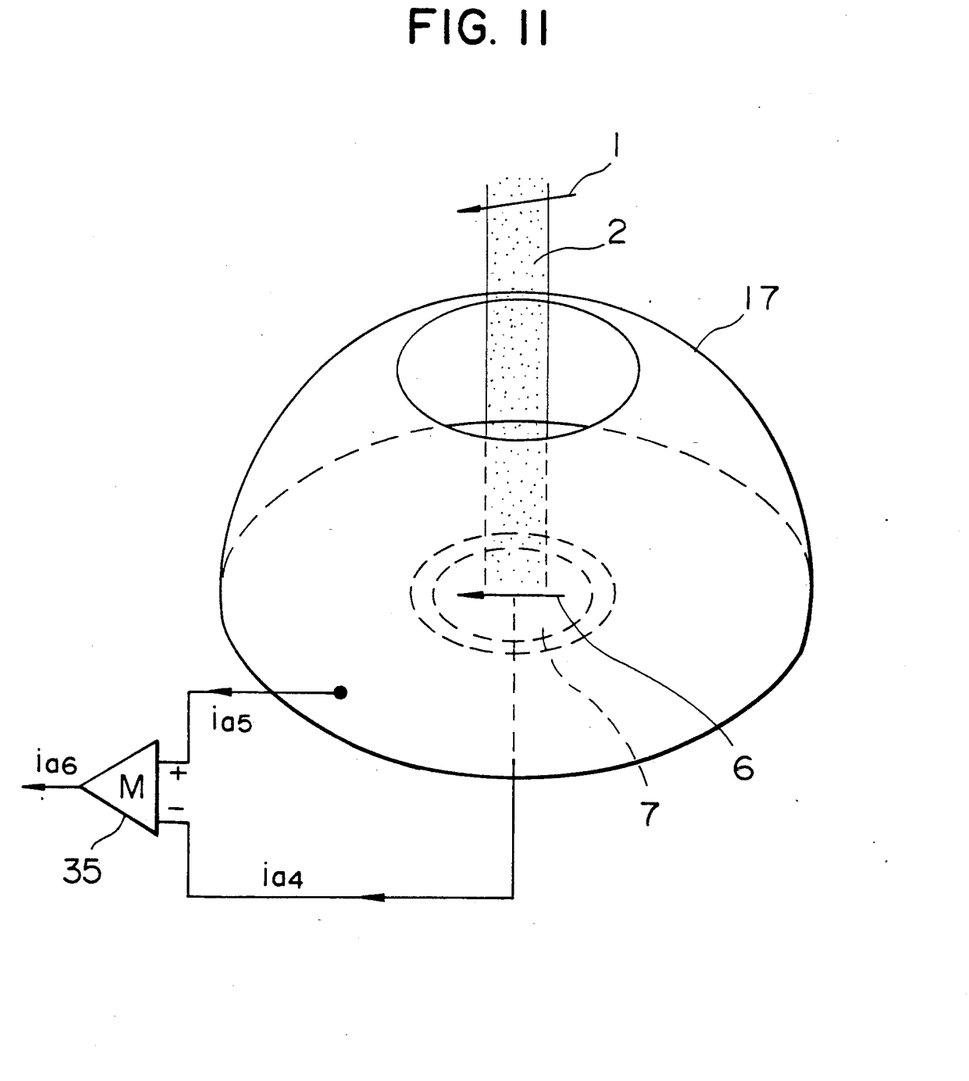
FIG. 11 shows a modified embodiment of an electron beam detector that can be applied to the aforementioned embodiments.

Furthermore, high precision detection of the polarization vector can be made by detecting the absorbed current and scattered electrons of the target any synthesizing them in such a manner as to acquire a greater amplitude. An example of such a detector is shown in FIG. 11. This drawing diverts the structure of the detector disclosed in the afore-mentioned reference JP-A-60-178460 entitled "Electron Spin Polarization Ratio Detector". The magnetization vector 6 is shown generated in the target 7 and the measured electron beam 2 is irradiated onto this target 7. A scattered electron beam detector 17 which is board at the portion of its bottom corresponding to the target 7 and is board at its upper part for the passage of the electron beam is disposed around the target 7. The absorbed current signal $i_{a4}$ obtained from the target 7 and the signal $i_{a5}$ obtained from the scattered electron detector 17 have the mutually inversed phases as such in FIGS. 2 and 4. Therefore, an adder 35 adds them in opposite polarities and obtains a signal current $i_{a6}$.

Figure 12:
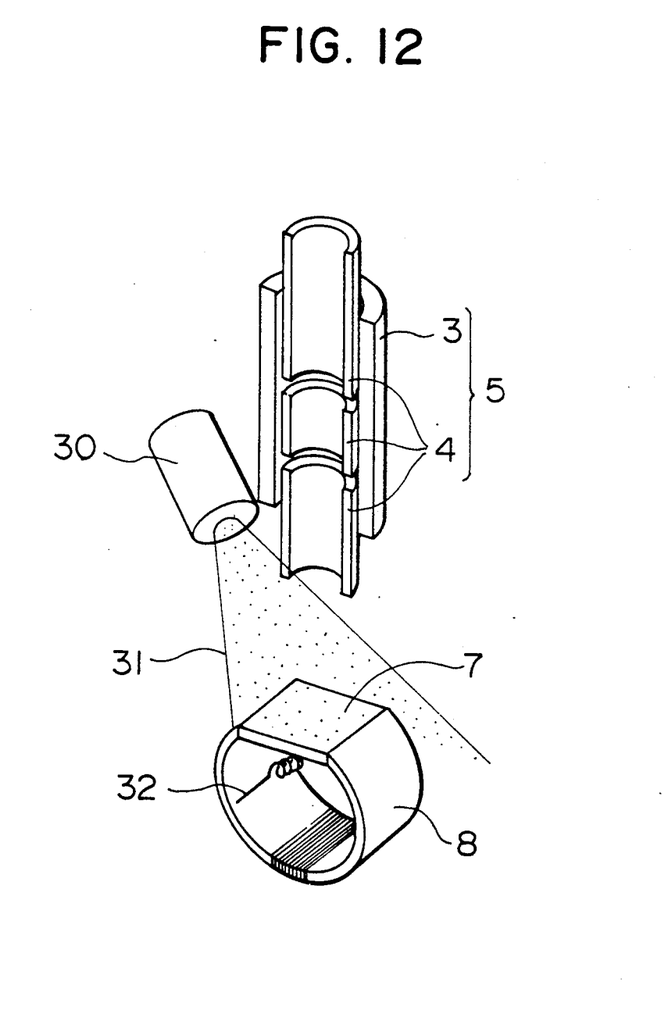
FIG. 12 is a conceptual view showing an example of a cleaning method of the target surface of the spin detector of the invention.

In the spin detector of the present invention, the target surface must be clean. FIG. 12 shows an example of this cleaning method with reference to the first and second embodiments.

An ion beam 31 from an ion gun 30 sputters the target surface and at the same time, the target is heated by the radiant heat from a heating filament 32 disposed at the back of the target. In this way, a clean surface can be obtained.

As is obvious from the explanation of the embodiments of the present invention given above, the position and angle of the electron beam may be controlled within the range which is permitted relatively widely with respect to the target. Therefore, the magnitude and direction of the polarization vector can be detected highly accurately and moreover, simultaneously, without using a high level of adjustment technique for making strict angle and position adjustment. Accordingly, the present invention provides extremely high scientific and industrial values.

We claim:

1. A spin detector utilizing dependence of a current value of an electron beam absorbed by a ferromagnetic target or of an electron beam scattered by said target on a spin state of an electron beam incident into said target, comprising:

means for rotating a polarization vector of an electron beam incident into said target, a trajectory of said electron beam or a magnetization vector of said target, so that said polarization vector and said magnetization vector rotate relatively to each other; and means for detecting the magnitudes of A.C. and D.C. components of the current value of the electron beam absorbed by said target or of the electron beam scattered by said target or of both of them;

wherein said spin detector is capable of detecting the direction and magnitude of said polarization vector by one measurement.

2. A spin detector according to claim 1, further comprising:

a polarization vector rotator comprising a magnetic field generation coil for rotating said polarization vector of the incident electron beam relative to said magnetization vector, and an electrostatic lens.

3. A spin detector according to claim 2, wherein said polarization vector rotator provides step-wise a rotation by 90°.

4. A spin detector according to claim 3, wherein said magnetic field generator provides step-wise a rotation by 90°.

5. A spin detector according to claim 1, further comprising:

a magnetic field generator for rotating said magnetization vector relative to said polarization vector of the electron beam.

6. A spin detector according to claim 1, wherein said ferromagnetic target is a ring-like target having a magnetization vector uniformly magnetized in a circumferential direction of said target, and the electron beam having said polarization vector kept in a predetermined direction is allowed to trace on said target.

7. A spin detector utilizing dependence of a current value of an electron beam absorbed by a ferromagnetic target or of an electron beam scattered by said target on a spin state of an electron beam incident into said target, comprising:

a plurality of targets having magnetization vectors thereon in mutually different directions and so disposed as to possess a predetermined inclination with respect to the center axis of an electron beam incident thereto;

means for irradiating an electron beam to said targets with a predetermined relationship with said targets; and means for detecting the magnitudes of A.C. and D.C. components of the current values of the electron beams absorbed by said targets or of the electron beams scattered by said targets or of both of them;

said spin detector capable of detecting the directions and magnitudes of said polarization vectors by one measurement.

* * * * *